United States Patent [19]

Mori

[11] Patent Number: 4,523,257
[45] Date of Patent: Jun. 11, 1985

[54] ARTIFICIAL LIGHT SOURCE DEVICE

[76] Inventor: Kei Mori, 3-16-3-501, Kaminoge, Setagaya-ku, Tokyo, Japan

[21] Appl. No.: 571,251

[22] Filed: Jan. 16, 1984

[30] Foreign Application Priority Data

Jan. 20, 1983 [JP] Japan .................................. 58-7605

[51] Int. Cl.³ .............................................. F21V 7/04
[52] U.S. Cl. ...................................... 362/32; 362/268;
362/293; 362/307; 362/328; 362/331; 362/355
[58] Field of Search .................. 162/32, 268, 293, 307,
162/328, 331, 355

[56] References Cited

U.S. PATENT DOCUMENTS 4,356,534 10/1982 Hattori ................................ 362/32
4,414,608 11/1983 Furihata ............................... 362/32
4,415,952 11/1983 Hattori et al. ........................ 362/32

Primary Examiner—Stephen J. Lechert, Jr.
Attorney, Agent, or Firm—Jordan and Hamburg

[57] ABSTRACT

An artificial light source device includes a light source lamp, a reflection mirror for converting light from the light source lamp into a parallel beam of light, an optical conductor rod having a light-receiving edge surface arranged opposite to the reflection mirror such that the parallel light is guided into the rod, and an optical conductor cable comprising a large number of optical fibers, the light-receiving edge surface of the cable being arranged opposite to the light-discharging edge surface of the rod, the light discharged from the optical fibers being used as the light source.

10 Claims, 8 Drawing Figures

ARTIFICIAL LIGHT SOURCE DEVICE

BACKGROUND OF THE INVENTION

The present invention generally relates to an artificial light source device and more particularly to an artificial light source device in which the light transmitted from a light source lamp is converted into parallel light by means of a parabola reflection mirror, the converted parallel light is guided once into the optical conductor rod, the light discharged from an optical conductor rod is guided into an optical conductor cable comprising a large number of optical fibers, and the light discharged from each optical fiber is used as the light source. In particular, after the parallel light reflected at the parabola reflection mirror passes once through the optical conductor rod; the light is guided into the optical conductor cable in order to guide it effectively and protect the light-receiving edge of the optical conductor cable from being burnt out. Further, the optical conductor cable is prevented from guiding ultraviolet rays.

In general, it might be possible to illuminate any place by the use of an electric lamp. However, illumination in explosive atmosphere or in water may result in danger of explosion or electric leakage. For this reason, an explosion-proof or water-proof electric appliance has to be chosen for use in such a place. However, such explosion-roof and water-proof appliances are voluminous, heavy, and expensive. Further, it is impossible to realize a perfectly explosion-proof or water-proof appliance. The present applicant previously proposed an optical composition reaction device for nuturing chlorella, etc. and a plant cultivation device for promoting cultivation of plants in an atmosphere containing carbon dioxide gas. These devices reuire light for performing optical composition reaction and the light source requires a large number of spotted light sources which do not discharge heat and which are small in size. For the purpose of realizing such light sources, the present applicant previously proposed various methods; that is to say, guiding the light obtained by focussing solar rays with a lens, etc. into an optical conductor cable comprising a large number of optical fibers, guiding the light through the optical conductor cable to an optical composition reaction device for the chlorella nurturing device and the plant-promotion-cultivating device, and so on, and using the light discharged from the optical fiber as the spotted light source. However, if the optical composition reaction device has to perform optical composition reaction even at night, artificial light is used instead of solar rays as an original light source. On that occasion, it might be necessary that the light from the artificial light source be guided into the light conductor cable and further guided to the optical composition reaction device through the optical conductor cable, and both the solar rays and the artificial light are alternatively used by switching them. When occasion demands, both the solar rays and the artificial light sometimes have to be used at the same time.

SUMMARY OF THE INVENTION

It is therefore the primary object of the present invention to provide a light source device in which the light from an artificial light source is transmitted through an optical conductor cable to the place where the illumination is needed.

It is another object of the present invention to provide a perfectly explosion-proof or water-proof light source, or a non-heat light source required for illumination in a studio or explosive atmosphere, or the sea-bottom or the like.

Another object of the invention is to provide a large number of extremely small-sized light sources which discharge no heat and cut off the ultraviolet rays, the light source being used in an optical composition reaction device.

An antificial light source device of the present invention comprises a light source lamp, a reflection mirror for converting light from the light source lamp into a parallel beam of light and reflecting the parallel light beam, an optical conductor rod, its light-receiving edge surface being arranged opposed to the reflection mirror and the parallel light being guided into the rod, and optical conductor cables comprising a large number of optical fibers, the light-receiving edge surface of the cables being arranged opposed to the light-discharging edge surface, and the light discharged from the optical fibers being used as the light source.

The above and other objects, features and advantages of the present invention will become apparent from the following detailed description taken with the accompanying drawings.

DESCRIPTION OF THE PREFERRED EMBODIMENTS

The present invention generally relates to an artificial light source device and more particularly to an artificial light source device in which the light transmitted from the light source lamp is converted into parallel light by means of a parabola reflection mirror, the converted parallel light being guided into the optical conductor rod, the light discharged from an optical conductor rod being guided into an optical conductor cable comprising a large number of optical fibers, and the light discharged from each optical fiber being used as the light source. In particular, after the parallel light reflected at the parabola reflection mirror passes through the optical conductor rod; the light is guided into the optical conductor cable in order to guide it effectively and protect the light-receiving edge of the optical conductor cable from being burnt out. Further, the optical conductor cable is prevented from ultraviolet rays to be guided.

Figure 1:
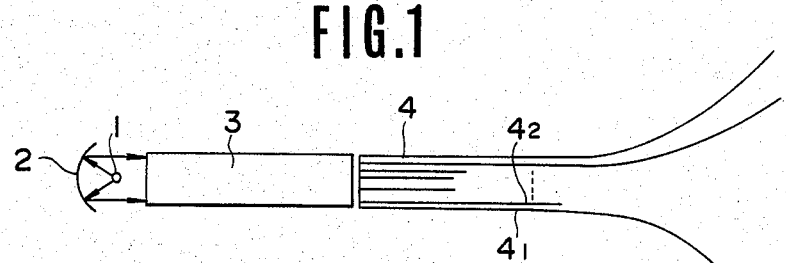
FIG. 1 is an outlined construction diagram for explaining one embodiment of the artificial light source device according to the present invention.

FIG. 1 is an outlined construction diagram for explaining an embodiment of the artificial light source device according to the present invention.

In FIG. 1, 1 is an artifical light source, 2, is a reflecting means, for instance, a parabola reflection mirror for converting the light from the artificial light source 1 into parallel light and reflecting it, 3 is an optical conductor rod for receiving the parallel light from the reflecting mirror 2, and 4 is an optical conductor cable consisting of a plurality of optical fibers, $4_1, 4_2, 4_3 \ldots$.

Figure 2:
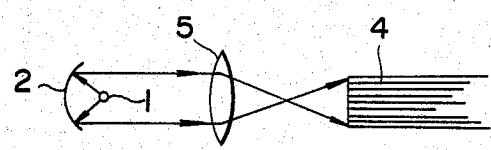
FIGS. 2 and 3 are outlined construction diagrams showing general examples.
Figure 3:
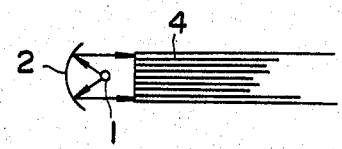
Figure 4:
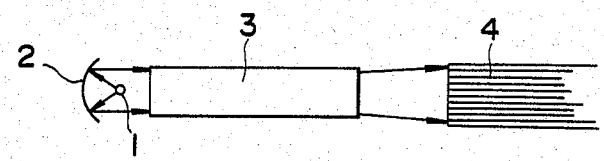
FIGS. 4 through 7 are construction diagrams showing other embodiments of the present invention.
Figure 5:
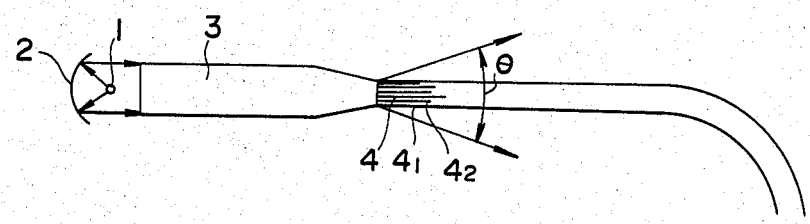
Figure 6:
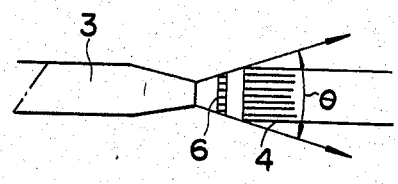

As shown in FIG. 1, the light from the artificial light source 1 is converted into the parallel light by means of the reflecting mirror 2, and the converted parallel light is guided into the optical conductor rod 3. And then, it is guided into the optical conductor cable 4 through the optical conductor rod 3. However, if the artifical light is guided through the optical conductor rod into the optical conductor cable according to the present invention, the heat and the ultraviolet rays from the artifical light source may be cut off, and the light may be effectively guided into the optical conductor cable. In this connection, FIGS. 2 and 3 are outlined construction diagrams showing general examples for guiding the light from the artificial light source into the optical conductor cable, respectively. In FIG. 2, the parallel light from the reflector mirror 2 is focussed by means of the lens 5 and guided into the optical conductor cable 4. In such an arrangement, since the distance between the light-receiving edge of the optical conductor cable 4 and the artificial light source 1 can be made long, the light-receiving edge of the optical conductor cable (the clad layer of the optical fiber) might be prevented from being burnt down due to the heat from the artificial light source. Instead, the light guided into the optical conductor cable 4 is focussed by the lens 5 and the incident light to be transmitted toward the optical conductor cable 4 enters into it with an incidence angle. When the incidence angle is equal to or more than the N.A. (Natural Aperture) of the optical conductor cable, the light cannot be guided into the optical conductor cable. And the position of the lens focus may become unstable due to color aberration. For this reason, it may be difficult to position the light-receiving edge of the optical cable. There exists the disadvantage that the incidence efficiency against the optical conductor cable may become worse if the positioning of the light-receiving edge cannot be precisely done. According to an example as shown in FIG. 3, the parallel light reflected at the reflecting mirror 2 is directly guided into the optical conductor cable 4. With this arrangement, the light-receiving edge of the light conductor cable 4 has to be kept close to the artificial light source 1 in order to effectively guide the reflected light into the optical conductor cable 4. Further, the clad layer of each optical fiber at the light-receiving edge side might be in danger of being burnt out. On the contrary, if the distance between the artificial light source 1 and the light-receiving edge of the optical conductor cable 4 is made long in order to avoid such burnt-out, the optical loss between them may increase. And, on both occasions, there is a disadvantage in that the ultraviolet rays discharged from the artificial light source 1 cannot be removed. However, according to the present invention, since the parallel light reflected by the reflecting mirror is once guided into the optical conductor rod and it is further guided into the optical conductor cable 4 as mentioned before, the distance between the artificial source and the light-receiving edge of the light conductor cable 4 can be made long so that the light-receiving edge may be protected from being burnt out. Furthermore, since the light reflected by the reflecting mirror is guided through the optical conductor rod into the optical conductor cable 4, the light-receiving edge of the optical conductor rod can be kept close to the artificial light source. Therefore, the parallel light reflected by the reflecting mirror can be effectively guided to the optical conductor cable 4 and further into the same. In addition, the ultraviolet rays contained in the artificial light source can be cut off by the optical conductor rod. If a pre-form rod, that is, a quartz rod, the core and cladding which are made of quartz, is used as the optical conductor rod 3, there exists very little light leakage at the supporting portion and the light-receiving part is not in danger of being burnt out.

Figure 7:
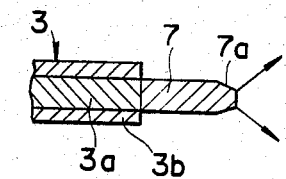

FIGS. 4 through 7 are construction diagrams showing other embodiments of the present invention, In those figures, the same reference numerals as those of FIG. 1 are affixed to the parts performing the same function as that of FIG. 1. In the embodiment shown in FIG. 4, the distance between the light-discharging edge of the optical conductor rod 3 and the light-receiving edge of the optical conductor 4 is made long to some extent. In such an arrangement, the heat transmitted through the optical conductor rod 3 can be prevented from being transmitted to the optical conductor cable 4. Further, a measuring instrument for measuring the light intensity, a prism for by-passing the light, and a filter for cutting off ultraviolet rays, can be interposed between them. In such an arrangement, various additional functions or additional improvements can be added between them. In the embodiment shown in FIG. 5, the light-discharging edge side of the optical conductor rod 3 is formed in a head-cut conical or frusto-conical shape. According to this embodiment, when a part of the parallel light transmitted through the optical conductor rod 3 is reflected at the head-cut conical-shaped portion, the radiation angle $\theta$, that is, N.A. can be made great. In the embodiment shown in FIG. 6, a filter 6 is interposed between the light-discharging edge surface of the optical conductor rod 3 and the light-receiving edge surface of the optical conductor cable 4, so that ultraviolet rays from the artifical light source 1 can be effectively cut off and the light from the same can be effectively guided into the optical conductor cable 4. In the embodiment shown in FIG. 7, the optical conductor rod 3 is the first optical conductor rod, and a second optical conductor rod 7 is connected to the light-discharging edge side of the first optical conductor rod 3, the light-discharging edge side of the second optical conductor rod 7 being formed with a head-cut conical shape 7a. In such an arrangement, the light transmitted through the first optical conductor rod 3 can be effectively diffused by means of the second optical conductor rod 7 and used as the illumination light source. In FIG. 7, 3a is a core portion, 3b is a clad portion, and both of them are made of quartz. (But the refractive index of the core portion 3a is greater than that of the clad portion 3b.)

Figure 8:
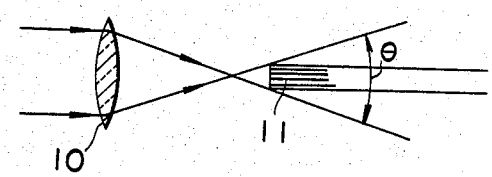
FIG. 8 is a diagram showing an embodiment of the solar ray light source according to the present invention.

FIG. 8 shows an embodiment of solar rays are light source according to the present invention. In FIG. 8, the solar ray is focussed by means of the lens 10 and guided into the optical conductor cable of fibers 11. Further, it is transmitted through the optical conductor cable or fibers 11 to the optional desired place and used for the purpose of illumination or other usages. On that occasion, the focussing angle $\theta$ of the lens 10 approximately coincides with N.A. of the optical conductor cable. In the embodiments shown in FIGS. 5 and 6, the head-cut conical portion at the light-discharging side of the optical conductor rod 3 is so formed so that the light-expanding angle of the light discharged from the head-cut conical portion coincides with the light-focussing angle shown in FIG. 8. In such an arrangement, it follows that the light-expanding angle of the light discharged from the optical fiber shown in FIGS. 5 and 6 turns out to be approximately equal to the light-expanding angle of the light discharged from the optical conductor cable or the optical fiber shown in FIG. 8. Supposing that the light discharged from these optical conductor cables 4 or optical fibers are united or switched for their usage, all of the light-expanding angles of the light discharged from all of the optical conductor cables 4 or the optical fibers may be equal to each other. In particular, in case both of the light from the artificial light source and the light from the solar ray light source are alternatively used by switching them as mentioned before, the illumination area does not change at all when they are switched alternatively, and it may be possible to switch them keeping the matching condition with the object to be illuminated.

As is apparent from the above-mentioned description, according to the present invention, the light from the artificial light source can be effectively guided into the optical conductor cable or the optical fibers. Stated more definitely, the light from the artificial light source can be guided into the same, without any fear of burn-out of the light-receiving edge surface, and with high guiding efficiency. Further, the ultraviolet rays may be cut off so that the light can be guided more effectively.

What is claimed is:

1. An artificial light source device comprising a light source lamp, a reflection mirror for converting light from said light source lamp into a parallel beam of light and reflecting said parallel beam of light, an optical conductor rod having a light-receiving edge surface and a light-discharging edge surface, said light-receiving edge surface being arranged opposite to said reflection mirror such that said parallel beam of light is guided into said optical conductor rod, and an optical conductor cable comprising a plurality of optical fibers, said cable having a light-receiving edge surface arranged opposite to said light-discharging edge surface of said optical conductor rod, the light discharged from said optical fibers being used as the light source, whereby the use of said optical conductor rod between said light source lamp and said optical conductor cable protects said light receiving edge surface of said optical conductor cable from burn-out.

2. An artificial light source device according to claim 1, wherein said optical conductor rod has an end portion juxtaposed to said light-discharging edge surface, said end portion having a frusto-conical configuration.

3. An artificial light source device according to claim 1 further comprising a filter disposed between said light-discharging edge surface of said optical conductor rod and said light-receiving edge surface of said cable.

4. An artificial light source device according to claim 1, wherein said optical conductor rod is made of quartz.

5. An artificial light source device according to claim 1, wherein said optical conductor rod has an end portion juxtaposed to said light-discharging edge surface, said end portion being formed in a head-cut conical shape.

6. An artificial light source device comprising a light source lamp, a reflection mirror for converting light from said light source lamp into a parallel beam of light and reflecting said parallel beam of light, a first optical conductor rod having a light-receiving edge surface and a light-discharging edge surface, said light-receiving edge surface of said first rod being arranged opposite to said reflection mirror such that said parallel beam of light is guided into said first rod, and a second optical conductor rod having a light-receiving edge surface and a light-discharging edge surface, said light-receiving edge surface of said second rod being arranged opposite to said light-discharging edge surface of said first rod, said second rod having an end portion juxtaposed to said light-discharging edge surface of said second rod, said end portion having a frusto-conical configuration.

7. An artificial light source device according to claim 6, wherein said second rod is used as the light source.

8. An artificial light source device according to claim 6, wherein the light transmitted through the first rod is diffused by the second rod and used as the light source.

9. An artificial light source device according to claim 6, wherein said first rod comprises a core portion about which a clad portion is disposed.

10. An artificial light source device according to claim 6, wherein said first rod is made of quartz.

* * * * *